Figure 1:
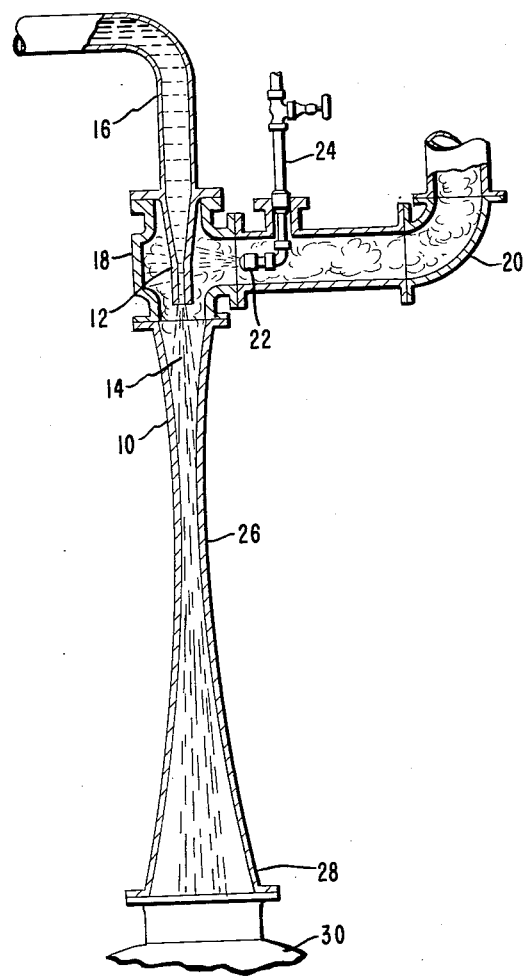

Jan. 2, 1962   J. M. SNYDER   3,015,539
PRODUCTION OF CYANIDE SALTS
Filed July 8, 1957   2 Sheets-Sheet 1

INVENTOR
JAMES M. SNYDER

BY
ATTORNEY

Jan. 2, 1962   J. M. SNYDER   3,015,539
PRODUCTION OF CYANIDE SALTS
Filed July 8, 1957   2 Sheets-Sheet 2
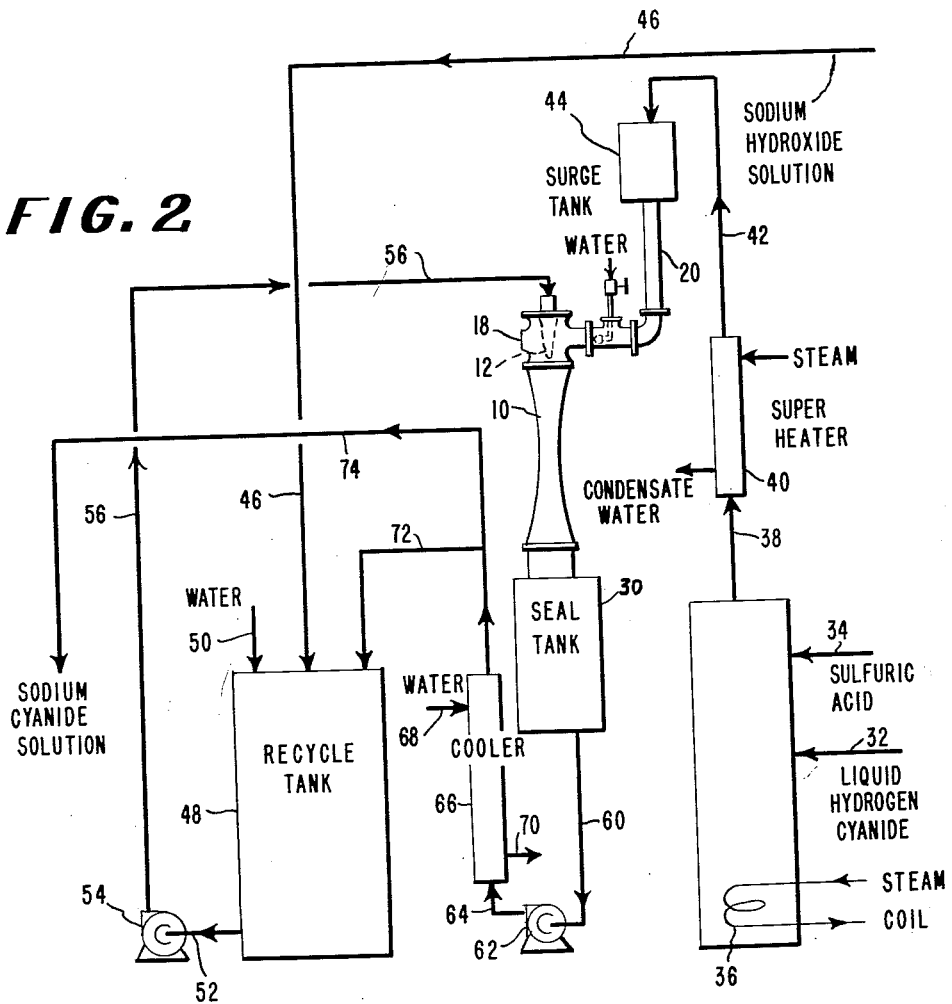
INVENTOR
JAMES M. SNYDER
BY *Norris E. Ruckman*
ATTORNEY ed States Patent Office 3,015,539
Patented Jan. 2, 1962

3,015,539
PRODUCTION OF CYANIDE SALTS
James M. Snyder, Memphis, Tenn., assignor to E. I. du Pont de Nemours and Company, Wilmington, Del., a corporation of Delaware
Filed July 8, 1957, Ser. No. 670,438
5 Claims. (Cl. 23—79)

This invention relates to the production of salts of hydrocyanic acid, and is more particularly concerned with a process and apparatus for producing alkali metal cyanides by mixing hydrogen cyanide vapor with an aqueous solution containing alkali metal hydroxide.

The neutralization of an acid with an alkaline solution to form a salt is usually simple in small scale operations. Serious technical difficulties are encountered in large scale commercial operation with hydrocyanic acid, however, because hydrogen cyanide readily polymerizes to brown resins which contaminate and discolor the desired salt and foul the equipment. Furthermore, cyanides tend to hydrolyze to formates, which is a highly objectionable impurity for many purposes and makes the product completely unsuitable for some uses of cyanides.

The rate of both polymerization and hydrolysis to formates increases as the temperature is raised, and the heat of reaction tends to produce undesirably high temperatures, particularly at interfaces where the hydrogen cyanide is first absorbed in the alkaline solution. It is uneconomical to employ refrigeration or large amounts of cooling water to control the temperature. It is likewise uneconomical to dilute the alkali with large amounts of water to control the temperature because excess water must be evaporated to recover the alkali cyanide product.

Polymerization of hydrogen cyanide does not occur in alkaline solutions at moderate temperatures, but a large amount of unneutralized alkali will contaminate the product and cause undesirable foaming when the cyanide is used in plating operations. Furthermore, even though suitable alkalinity and temperature conditions to avoid formation of polymer and formates are maintained in the solution as a whole, there will nevertheless be an excess of hydrogen cyanide and momentarily high temperatures in the film of solution where hydrogen cyanide is first absorbed. Improved efficiency of mixing would shorten the duration of this undesirable localized condition, by bringing alkali to the gas-liquid interface and dissipating the heat of reaction through the solution, thereby reducing formation of both polymer and formate.

Another difficulty is polymer formation on walls of the mixing apparatus which are in contact with hydrogen cyanide in the vicinity of the alkaline solution. The initial cause of this polymerization is not clear but may result from drops of solution splashing onto the walls and then absorbing hydrogen cyanide until an excess is present. Once the polymerization is initiated it proceeds auto-catalytically to produce further polymer. A deposit accumulates in a few hours which obstructs the flow of hydrogen cyanide and colors the cyanide solution to such an extent that the process has had to be interrupted while the apparatus is cleaned. Even before the flow is seriously obstructed or the polymer has started to enter the solution to such an extent that the product is seriously discolored, flow of fluids may be restricted by the increasing deposit to an extent which undesirably slows the process. Elimination of such costly interruptions of the process, loss of cyanide, and the necessity of reworking product to remove color and other impurities therefrom are important economic considerations.

It is an object of this invention to provide an improved process for mixing hydrogen cyanide vapor with an aqueous solution containing alkali metal hydroxide in the production of alkali metal cyanide which avoids the formation of polymer and formate. Another object is to provide such a process which can be operated continuously without expensive shutdowns for cleaning. A further object is to provide suitable apparatus for economical operation of the process. Other objects will become apparent from the specification and claims.

The improved process of this invention comprises feeding hydrogen cyanide vapor into one end of an elongated chamber to maintain a vapor zone, spraying liquid water into the vapor zone in sufficient quantity to wet all of the surfaces on which hydrogen cyanide polymer tends to form in the vapor zone, and passing an aqueous solution containing alkali metal hydroxide through the chamber at a velocity which provides a turbulent mixing zone separating the vapor zone from a solution exit at the other end of the chamber.

In the drawings, which illustrate embodiments of the invention,

FIGURE 1 shows a specific embodiment of the mixing apparatus of this invention, and FIGURE 2 is a schematic representation of one way of assembling the apparatus of FIG. 1 with other equipment in the practice of the process.

The embodiment of the apparatus of this invention shown in FIG. 1 comprises a mixing chamber 10, a nozzle 12 for directing a liquid stream 14 through the mixing chamber, a liquid conduit 16 for supplying aqueous alkaline solution to the nozzle, a vapor chamber 18 surrounding the nozzle and opening into the mixing chamber for introducing hydrogen cyanide vapor into the mixing chamber, a vapor conduit 20 for supplying hydrogen cyanide vapor to the vapor chamber, a spray head 22 for spraying liquid water into the vapor chamber, and a water conduit 24 for supplying water to the spray head.

The mixing chamber 10 may be of any generally cylindrical shape having a length considerably greater than its average diameter. Preferably it has the diffuser shape shown, in which the chamber tapers to a minimum diameter near the middle 26 and then flares out to a maximum diameter at the exit 28. This has the advantage of providing a zone in which the solution is at high velocity for efficient mixing with hydrogen cyanide, followed by a zone in which the velocity of the solution is reduced before discharging into the next unit, such as a surge tank 30. Suitable dimensions for the mixing chamber and the nozzle 12 should be selected to provide a high velocity flow, from a solution supplied by a centrifugal pump, and to provide a turbulent mixing zone separating the vapor supplied from the chamber exit 28 under the particular conditions of operation.

The use of the above apparatus in the practice of the invention will become clear by considering FIG. 2, in which other apparatus is shown schematically. Hydrogen cyanide is shown entering the system in liquid form through line 32. The hydrogen cyanide usually contains a small amount of sulfuric acid, e.g., 0.01%, to prevent formation of hydrogen cyanide polymer at normal temperatures. A small amount of sulfuric acid, e.g., about 0.01% based on the weight of the hydrogen cyanide, may be added through line 34 to inhibit polymerization at the higher temperature of the vapor. The liquid is vaporized at the required rate by heat from steam coil 36. The hydrogen cyanide vapor passes through line 38 to a superheater 40, which may also be heated by steam, where the temperature is raised to about 40° C. to avoid any subsequent condensation in the vapor system. If condensate remained in the system for an appreciable length of time, polymerization would occur and would proceed auto-catalytically to produce an accumulation which would have to be removed to permit the required rate of flow.

The superheated vapor passes through line 42 to surge tank 44. This tank is a safety device to prevent flow of alkaline solution back to the vaporizer if an obstruction occurs in a subsequent part of the operation. Flow of alkaline solution into the vaporizer would cause a violent reaction with and polymerization of the liquid hydrogen cyanide. The vapor passes from the surge tank through conduit 20 to the vapor chamber 18 of the mixing apparatus.

A relatively concentrated aqueous solution of the alkali metal hydroxide to be reacted with the hydrogen cyanide enters the system through line 46. For purposes of illustration, a solution of sodium hydroxide is indicated, but a solution of potassium hydroxide or other alkali metal hydroxide can be used in the same way to produce potassium cyanide or other alkali metal cyanide. The sodium hydroxide solution is not fed directly to the mixer, but is first diluted with aqueous sodium cyanide solution in recycle tank 48 to form a solution containing from 1 to 10% of sodium hydroxide, and preferably 4 to 10% of sodium hydroxide. Relatively concentrated sodium cyanide solution is used for the dilution in order to minimize the amount of water to be evaporated in subsequent recovery of sodium cyanide from solution. If further dilution is required to adjust the concentration of solution to the desired value, water is added to the tank through line 50. The solution should contain at least about 30% sodium cyanide, but should not exceed about 46% concentration at usual operating temperatures in order to avoid crystallization in the lines.

The aqueous solution of sodium hydroxide and sodium cyanide flows through line 52 to a centrifugal pump 54 and is forced under pressure through line 56 to nozzle 12 of the mixing apparatus. The solution passes at high velocity through the mixing chamber 10, entraining and mixing with hydrogen cyanide from the vapor chamber. A highly efficient and thorough mixing is provided whereby absorption of the hydrogen cyanide into the solution is complete in the very brief interval of time during which a given portion of the solution is in the mixer. The heat of reaction between hydrogen cyanide and sodium hydroxide is considerable and the temperature should not be permitted to rise above 75° C. to avoid hydrolysis to formate. The resulting solution must also be alkaline to avoid formation of hydrogen cyanide polymers, so this operation should be conducted to leave at least 0.2% of unreacted sodium hydroxide. These conditions are maintained by controlling the rate at which the solution is fed to the mixing apparatus, the concentration of sodium hydroxide in that solution, and by removing the heat of reaction from recycled sodium cyanide solution. The latter is accomplished as described in the next step.

The solution passes from the mixing apparatus into a seal tank 30, which is primarily a precaution against carry-through of unreacted hydrogen cyanide if interruption of the liquid flow should occur. The solution then flows through line 60 to a pump 62 and is pumped through line 64 to a cooler 66. A suitable cooler is of the heat exchanger type with cooling water circulating around tubes through which the solution is passed. Cooling water is supplied through line 68 and leaves through line 70. The cooler removes the heat of reaction, preferably reducing the temperature of the solution to about 40 to 50° C., since decomposition of the salt is much more likely to take place at higher temperatures. Because of the relatively high concentration of sodium cyanide in the solution, however, the temperature should be maintained above a minimum of about 35° C. so that sodium cyanide will not crystallize out prematurely and plug the lines.

Most of the sodium cyanide solution from the cooler, up to about 90%, is passed through line 72 to the recycle tank 48 to be mixed with fresh caustic, and is then returned to the mixing apparatus as previously described. The remainder of the sodium cyanide solution is diverted through line 74. This solution may be shipped as such for use in organic syntheses, but will usually be processed to recover solid sodium cyanide.

Methods are known which are suitable for recovering a high quality solid product from the above solution and will not be discussed in detail. In general, these methods involve removing sufficient water in a vacuum evaporator to produce a slurry of sodium cyanide crystals and solution, filtering the slurry to separate the crystals and returning the filtrate to the evaporator, and drying the crystals to remove moisture and recover the solid product. The sodium cyanide is commonly pressed into briquettes or "eggs" weighing about 1 ounce for shipment. As in the reaction process described previously, formation of undesirable cyanide polymers and formates is avoided by maintaining an excess of sodium hydroxide in solution and by keeping the temperature sufficiently low. The concentration of sodium hydroxide should be at least 0.2% but should not exceed about 3% in order to avoid contaminating the product. The concentration can be prevented from increasing above this value by returning solution to the reaction process or by adding hydrogen cyanide directly to the evaporator. The temperature can be maintained at a suitable value during evaporation by using subatmospheric pressure.

The process and mixing apparatus of this invention enable the reaction of hydrogen cyanide with alkali metal hydroxide in aqueous solution to be carried out economically to produce alkali metal cyanide solutions of high purity. The reaction can be conducted continuously as a large scale commercial operation with relatively inexpensive equipment without expensive shutdowns for cleaning, without uneconomical loss of cyanide in side reactions, and without special treatment of the alkali metal cyanide to remove impurities. The simple expedient of spraying water into the vapor zone during mixing of hydrogen cyanide vapor with the alkali metal hydroxide solution avoids accumulation of polymer on the walls, and thereby permits uninterrupted operation at full capacity without fouling the equipment and without contaminating the product.

Only a small amount of water need be sprayed into the vapor space of the mixing apparatus to accomplish the surprising result of keeping polymerization at such a low level that there is no discoloration of solutions or product as a result of polymer formation in the mixing apparatus, and no operating interruptions for cleaning. A suitable amount of water is from 0.04 to 0.5 gallon per 100 gallons of solution passing through the mixing apparatus, with an optimum of about 0.20 to 0.25 gallon of water per 100 gallons of solution for an effective water spray. The water is conveniently supplied from a water main under customary pressure, using an ordinary valve to control the flow. A one-quarter inch pipe line is adequate for flows up to about 1 gallon per minute. A small spray head 22 of a conventional type producing a fine spray is suitable. It should be oriented so as to wet all of the surfaces exposed to hydrogen cyanide vapor in the vapor zone, i.e., the surfaces on which polymer tends to accumulate. The position of the spray head shown in FIGURE 1 is merely a convenient one for purposes of installation, and other locations will serve equally as well. The spray is preferably operated continuously, although intermittent operation at intervals of not over 15 minutes will provide a marked improvement over operation without any spray.

When the water spray is eliminated from the process described, the accumulation of hydrogen cyanide polymer has become so serious after only 8 hours of operation that the process has had to be interrupted to remove it.

The down-time for cleaning the mixing apparatus under these conditions has been found to amount to at least 10% of the time of operation. This highly uneconomical loss of time and hydrogen cyanide, as well as the expense of cleaning equipment and reworking contaminated product, is avoided by the present invention.

Since many different embodiments of the invention may be made without departing from the spirit and scope thereof, it is to be understood that the invention is not limited by the specific illustrations except to the extent defined in he following claims.

I claim:

1. In the production of alkali metal cyanide by mixing hydrogen cyanide vapor with an aqueous solution containing alkali metal hydroxide, the process which comprises feeding hydrogen cyanide vapor into one end of an elongated chamber to maintain a vapor zone, spraying sufficient liquid consisting essentially of water into said vapor zone to wet all of the surfaces exposed to hydrogen cyanide vapor in the vapor zone, and passing an aqueous solution containing alkali metal hydroxide concurrently with said vapor through the chamber at a velocity which provides a turbulent mixing zone separating said vapor zone from a solution exit at the other end of the chamber.

2. In the production of alkali metal cyanide by mixing hydrogen cyanide vapor with an aqueous solution containing alkali metal hydroxide, the process which comprises feeding hydrogen cyanide vapor into one end of an elongated chamber to maintain a vapor zone, passing an aqueous solution containing alkali metal hydroxide concurrently with said vapor into the chamber at a velocity which provides a turbulent mixing zone separating said vapor zone from a solution exit at the other end of the chamber, and spraying liquid consisting essentially of water into said vapor zone to wet all of the surfaces exposed to hydrogen cyanide vapor in the vapor zone, the volume of said water being from 0.04 to 0.5% of the volume of said aqueous solution passed through the chamber.

3. In the production of alkali metal cyanide by mixing hydrogen cyanide vapor with an aqueous solution containing alkali metal hydroxide, the process which comprises feeding hydrogen cyanide vapor into one end of an elongated chamber to maintain a vapor zone, spraying sufficient liquid consisting essentially of water into said vapor zone to wet all of the surfaces exposed to hydrogen cyanide vapor in the vapor zone, and passing an aqueous solution containing from about 1% to 10% by weight of alkali metal hydroxide concurrently with said vapor through the chamber at a velocity which provides a turbulent mixing zone separating said vapor zone from a solution exit at the other end of the chamber and which leaves at least about 0.2% of unreacted alkali metal hydroxide in the solution leaving the chamber.

4. In the production of alkali metal cyanide by mixing hydrogen cyanide vapor with an aqueous solution containing alkali metal hydroxide, the process which comprises feeding hydrogen cyanide vapor into one end of an elongated chamber to maintain a vapor zone, spraying sufficient liquid consisting essentially of water into said vapor zone in sufficient quantity to wet all of the surfaces exposed to hydrogen cyanide vapor in the vapor zone, and passing an aqueous solution containing from about 1% to 10% by weight of alkali metal hydroxide concurrently with said vapor through the chamber at a velocity which provides a turbulent mixing zone separating said vapor zone from a solution exit at the other end of the chamber and which will maintain the temperature below about 75° C.

5. In the production of alkali metal cyanide by mixing hydrogen cyanide vapor with an aqueous solution containing alkali metal hydroxide, the process which comprises feeding hydrogen cyanide vapor into one end of an elongated chamber to maintain a vapor zone, spraying liquid consisting essentially of water into said vapor zone in sufficient quantity to wet all of the surfaces exposed to hydrogen cyanide vapor in the vapor zone, and passing an aqueous solution containing at least 30% by weight of sodium cyanide and 4% to 10% of sodium hydroxide concurrently with said vapor through the chamber at a velocity which provides a turbulent mixing zone separating said vapor zone from solution exit at the other end of the chamber and which will provide an exit solution containing about 0.2% to 3% of unreacted sodium hydroxide and up to 46% of sodium cyanide.

References Cited in the file of this patent

UNITED STATES PATENTS

| | | |
|---|---|---|
| 2,020,902 | Myhren | Nov. 12, 1935 |
| 2,155,315 | Kremers | Apr. 18, 1939 |
| 2,213,211 | Fleckenstein et al. | Sept. 3, 1940 |
| 2,684,231 | Pomykala | July 20, 1954 |
| 2,708,151 | McMinn | May 10, 1955 |
| 2,726,139 | Oliver | Dec. 6, 1955 |
| 2,798,794 | Muench et al. | July 9, 1957 |
| 2,876,066 | Inman | Mar. 3, 1959 |